US012652426B2

(12) United States Patent
Liu et al.

(10) Patent No.: US 12,652,426 B2
(45) Date of Patent: Jun. 9, 2026

(54) TECHNIQUES FOR TRAFFIC SURGE PROTECTION OF LIVE ORIGIN SERVER

(71) Applicant: NETFLIX, INC., Los Gatos, CA (US)

(72) Inventors: Xiaomei Liu, Cupertino, CA (US); Joseph Lynch, Gaithersburg, MD (US)

(73) Assignee: NETFLIX, INC., Los Gatos, CA (US)

( * ) Notice: Subject to any disclaimer, the term of this patent is extended or adjusted under 35 U.S.C. 154(b) by 2 days.

(21) Appl. No.: 18/780,278

(22) Filed: Jul. 22, 2024

(65) Prior Publication Data

US 2026/0025539 A1     Jan. 22, 2026

(51) Int. Cl.
| | |
|---|---|
| *H04N 21/239* | (2011.01) |
| *H04N 21/2183* | (2011.01) |
| *H04N 21/222* | (2011.01) |
| *H04N 21/231* | (2011.01) |

(52) U.S. Cl.
CPC ..... *H04N 21/2393* (2013.01); *H04N 21/2183* (2013.01); *H04N 21/222* (2013.01); *H04N 21/23106* (2013.01)

(58) Field of Classification Search
CPC ............. H04N 21/2183; H04N 21/222; H04N 21/23106; H04N 21/2393
See application file for complete search history.

(56) References Cited

U.S. PATENT DOCUMENTS

| | | | | |
|---|---|---|---|---|
| 7,010,685 | B1 * | 3/2006 | Candelore | ........ H04N 21/63345 |
| | | | | 380/280 |
| 7,068,789 | B2 * | 6/2006 | Huitema | ............. H04L 63/1458 |
| | | | | 713/168 |

| | | | | |
|---|---|---|---|---|
| 7,614,069 | B2 * | 11/2009 | Stone | ............... H04N 21/25435 |
| | | | | 725/89 |
| 7,650,624 | B2 * | 1/2010 | Barsoum | ................. H04N 7/081 |
| | | | | 725/23 |
| 8,032,911 | B2 * | 10/2011 | Ohkita | ................ H04L 61/5038 |
| | | | | 725/74 |
| 8,121,706 | B2 * | 2/2012 | Morikawa | ........... H04L 12/2814 |
| | | | | 725/74 |
| 8,381,310 | B2 * | 2/2013 | Gangotri | ................. H04L 63/10 |
| | | | | 726/32 |
| 10,277,669 | B1 | 4/2019 | Joliveau et al. | |
| 10,855,792 | B2 * | 12/2020 | Knox | ...................... H04L 67/02 |
| 2003/0056093 | A1 * | 3/2003 | Huitema | ............... H04L 67/104 |
| | | | | 713/156 |
| 2004/0117856 | A1 * | 6/2004 | Barsoum | ............ G06Q 30/0207 |
| | | | | 348/E7.071 |
| 2004/0162105 | A1 * | 8/2004 | Reddy | ................... H04W 12/06 |
| | | | | 455/551 |

(Continued)

OTHER PUBLICATIONS

International Search Report for Application No. PCT/US2025/038249 dated Oct. 22, 2025.

*Primary Examiner* — Michael B. Pierorazio
(74) *Attorney, Agent, or Firm* — Artegis Law Group, LLP

(57)     ABSTRACT

One embodiment of a method for responding to requests for media content includes receiving a first request from a first client for at least one segment of a media content item, retrieving, from a datastore, a reference to each segment included in the at least one segment, retrieving, from a cache, the at least one segment of the media content item based on the reference to each segment included in the at least one segment, and transmitting the at least one segment of the media content item to the first client.

20 Claims, 5 Drawing Sheets

(56)　　　　References Cited

U.S. PATENT DOCUMENTS

| | | | | |
|---|---|---|---|---|
| 2005/0216942 | A1* | 9/2005 | Barton | H04N 21/6125 348/E7.071 |
| 2005/0283815 | A1* | 12/2005 | Brooks | H04H 20/78 725/127 |
| 2005/0289632 | A1* | 12/2005 | Brooks | H04N 7/17309 725/127 |
| 2006/0010481 | A1* | 1/2006 | Wall | H04N 7/163 725/151 |
| 2006/0111144 | A1* | 5/2006 | Nakajima | H04L 67/54 455/556.1 |
| 2006/0212197 | A1* | 9/2006 | Butler | B60R 11/0235 701/1 |
| 2006/0225105 | A1* | 10/2006 | Russ | H04N 7/17318 348/E7.071 |
| 2007/0050822 | A1* | 3/2007 | Stevens | H04N 7/14 725/74 |
| 2007/0067808 | A1* | 3/2007 | DaCosta | H04N 21/6581 348/E7.071 |
| 2007/0079341 | A1* | 4/2007 | Russ | H04N 21/43615 725/89 |
| 2007/0101185 | A1* | 5/2007 | Ostrowka | H04N 21/4334 714/6.13 |
| 2007/0124775 | A1* | 5/2007 | DaCosta | H04N 21/6582 348/E7.071 |
| 2007/0130601 | A1* | 6/2007 | Li | H04N 21/6405 725/112 |
| 2007/0157281 | A1* | 7/2007 | Ellis | H04N 21/4147 725/74 |
| 2007/0282990 | A1* | 12/2007 | Kumar | H04L 65/80 709/223 |
| 2008/0013919 | A1* | 1/2008 | Boston | G11B 19/00 |
| 2008/0092168 | A1* | 4/2008 | Logan | H04N 21/4622 725/44 |
| 2008/0134245 | A1* | 6/2008 | DaCosta | H04N 21/482 348/E7.071 |
| 2008/0134256 | A1* | 6/2008 | DaCosta | H04N 21/43615 348/E7.071 |
| 2008/0155615 | A1* | 6/2008 | Craner | H04N 7/17318 348/E7.071 |
| 2008/0178252 | A1* | 7/2008 | Michaud | H04L 63/083 726/1 |
| 2008/0235733 | A1* | 9/2008 | Heie | H04N 21/482 725/46 |
| 2008/0244658 | A1* | 10/2008 | Chen | H04N 21/47211 348/E7.071 |
| 2008/0263611 | A1* | 10/2008 | Lecomte | H04N 21/47202 348/E7.071 |
| 2009/0183199 | A1* | 7/2009 | Stafford | H04N 7/165 725/34 |
| 2009/0205010 | A1* | 8/2009 | Rodriguez | H04N 21/4402 725/151 |
| 2009/0313662 | A1* | 12/2009 | Rodriguez | H04N 19/39 725/87 |
| 2010/0005483 | A1* | 1/2010 | Rao | H04N 21/63345 725/25 |
| 2010/0071076 | A1* | 3/2010 | Gangotri | G11B 20/00086 726/32 |
| 2010/0125876 | A1* | 5/2010 | Craner | H04N 21/4331 725/37 |
| 2011/0191439 | A1* | 8/2011 | Dazzi | G06F 15/16 709/217 |
| 2011/0191446 | A1* | 8/2011 | Dazzi | H04L 65/612 709/219 |
| 2012/0309515 | A1* | 12/2012 | Chung | H04N 21/4781 463/31 |
| 2016/0173639 | A1 | 6/2016 | Tuliani et al. | |
| 2017/0188054 | A1 | 6/2017 | Ma et al. | |
| 2018/0367637 | A1 | 12/2018 | Balazinski et al. | |
| 2021/0168416 | A1* | 6/2021 | Weiner | H04N 21/235 |
| 2023/0038275 | A1* | 2/2023 | Fieldhouse | H04N 21/222 |
| 2023/0370665 | A1* | 11/2023 | Webb | H04N 21/2668 |

* cited by examiner

400

Receive a write request from packager — 402

Write media content and metadata to datastore — 404

Write media content asynchronously to cache — 406

TECHNIQUES FOR TRAFFIC SURGE PROTECTION OF LIVE ORIGIN SERVER

BACKGROUND

Field of the Various Embodiments

The various embodiments relate generally to computer science, media content streaming, and, more specifically, to techniques for traffic surge protection of a live origin server.

Description of the Related Art

Media streaming is the process of continuously transmitting media content over a network for playback by client applications. To stream media content items, a live origin server can be used to transmit the media content items (e.g., video and/or audio) and related metadata to client applications that play back the media content items. The live origin server can receive the media content items from one or more publishing servers, and the live origin server is considered the source of truth for the media content items.

A content delivery network (CDN) is a network of geographically distributed servers used to provide faster delivery of content to client applications. A CDN can store copies of media content items from a live origin server to provide faster delivery of the media content items and reduce traffic to the live origin server. Storing copies of media content items in a CDN is also referred to herein as caching the media content items in the CDN.

One drawback of using a CDN is that, when servers of the CDN are unable to serve requested media content items, such as when the CDN servers are down or the CDN servers have not cached the requested media content items, a large number of requests for the same media content items can be forwarded to the live origin server at once, which is also referred to as a "traffic surge." For example, during the live streaming of a given media content item, a CDN server may not have cached the most recent segments of the given media content item. As another example, media content items stored on a CDN server could be manually invalidated in an event referred to as a "digital video recorded (DVR) flush." In such cases, the CDN server will forward requests for the invalidated media content items to the live origin server, which can result in a traffic surge at the live origin server. During the traffic surge, the live origin server or the live origin storage servers can become overwhelmed and be unable to handle the incoming requests for media content items. During the traffic surge, the live origin server may also be unable to handle requests to write new segments of media content items to storage at the live origin server, which can result in the media content items remaining incomplete at the live origin server.

As the forgoing illustrates, what is needed in the art are more effective techniques to protect against traffic surges at live origin servers.

SUMMARY

One embodiment of the present disclosure sets forth a computer-implemented method for responding to requests for media content. The method includes receiving a first request from a first client for at least one segment of a media content item. The method also includes retrieving, from a datastore, a reference to each segment included in the at least one segment. The method further includes retrieving, from a cache, the at least one segment of the media content item based on the reference to each segment included in the at least one segment. In addition, the method includes transmitting the at least one segment of the media content item to the first client.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is that the disclosed techniques can more effectively handle requests to a live origin server during traffic surges by separately handling read and write requests and by prioritizing more important requests over less important requests. In addition, the disclosed techniques read media content item segments from a cache of the live origin server, which can prevent a datastore of the live origin server from being overwhelmed during traffic surges. Further, the disclosed techniques provide strong read-after-write consistency, allowing the live origin server to determine if a media content item segment has changed as the result of a write request, in which case the live origin can return the media content item segment from the datastore rather than from the cache. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
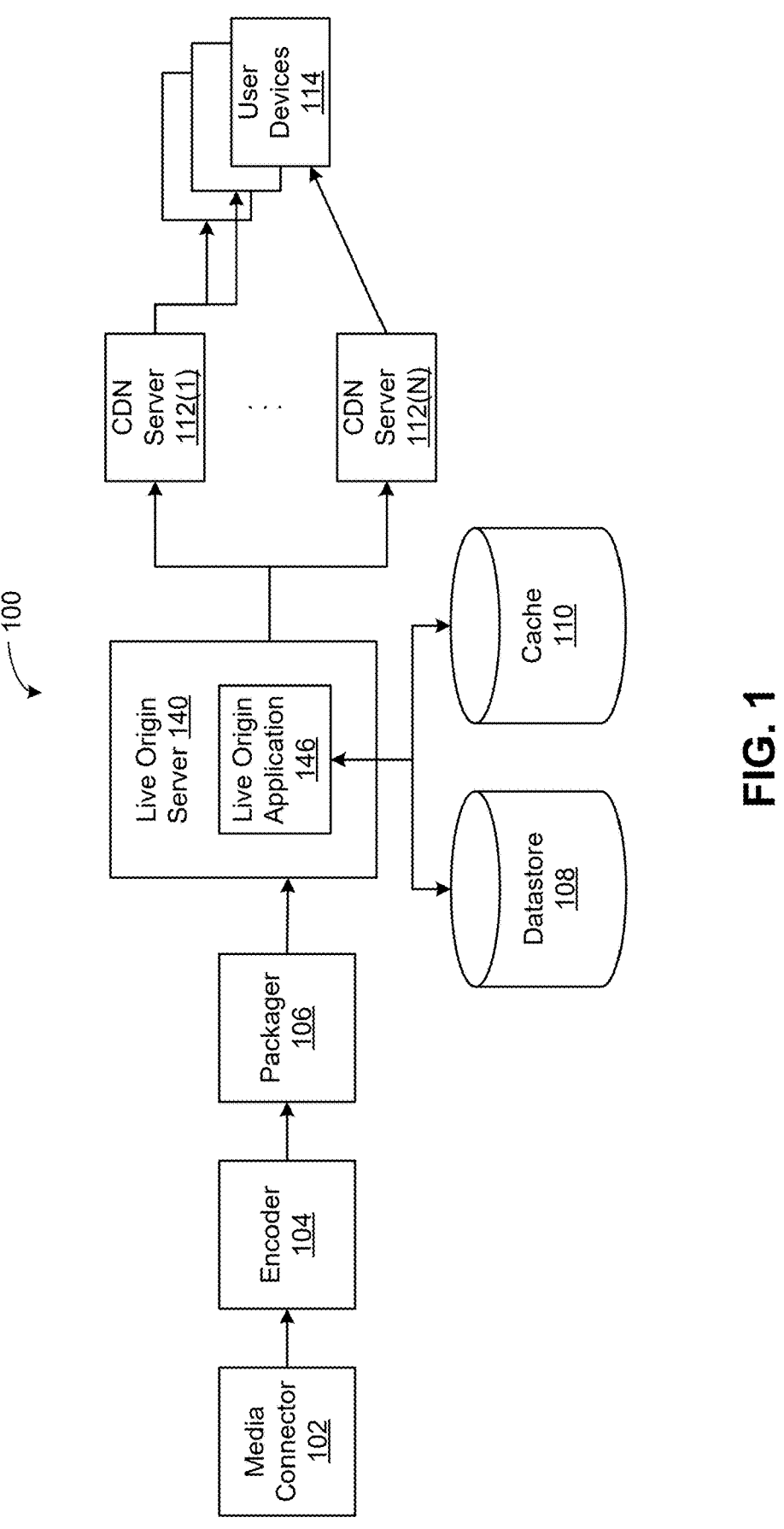
FIG. 1 illustrates a block diagram of a computer-based system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

A content delivery network (CDN) can store copies of media content items from a live origin server to provide faster delivery of the media content items and reduce traffic to the live origin server. One drawback of using a CDN is that, when servers of the CDN are unable to serve requested media content items, such as when the CDN servers are down or the CDN servers have not cached the requested media content items, a large number of requests for the same media content items can be forwarded to the live origin server at once, which is also referred to as a "traffic surge." During the traffic surge, the live origin server can become overwhelmed and be unable to handle the incoming requests for media content items. During the traffic surge, the live origin server may also be unable to handle requests to write new segments of media content items to storage at the live origin server, which can result in the media content items remaining incomplete at the live origin server.

With the disclosed techniques, a live origin server can be protected from traffic surges. In some embodiments, read and write paths in the live origin server are separated, and requests are prioritized during traffic surges so that less important requests are dropped before more important requests. When a publishing stack of the live origin server receives a request from the source of a media content item to write a segment of the media content item, the publishing stack assigns a unique segment identifier (ID), segment arrival time, and segment duration to the media content item segment. Then, the publishing stack requests a write stack of the live origin server to write the media content item segment to a datastore. The write stack writes the media content item segment and metadata specifying the ID and the timestamp to the datastore. Asynchronously, the publishing stack writes the media content item segment to a cache of the live origin server. The media content item segment written to the cache is addressable using the metadata written to the datastore. When a read request for a media content item segment is received by the live origin server, a CDN stack of the live origin server retrieves metadata related to the media content item segment using a read stack of the live origin server, and the CDN stack requests, via the read stack and using the metadata, the media content item segment from the cache. The cache can return the media content item segment to the read stack if the media content item segment is stored in the cache. If the media content item segment is not stored in the cache, or if the metadata indicates that the media content item segment has been updated in the datastore, then the read stack will read the media content item segment from the datastore instead. The live origin server also detects traffic surges by tracking datastore utilization, such as by computing a percentage of datastore responses that are slower than a predefined threshold that indicates high datastore utilization, i.e., a traffic surge or pending traffic surge. During high datastore utilization, the live origin server prioritizes write requests, in which new media content item segments are being written to the live origin server, over read requests, in which media content item segments are being read by client applications from the live origin server. For the read requests, the CDN stack prioritizes requests for media content item segments associated with a live edge over requests for DVR media content item segments. The live edge is the media that is within a time window of the live broadcast stream (e.g., less than 5 minutes from the live stream), while the DVR media content represents non live streaming media broadcasted more than the time window from the live edge. The CDN stack detects a read request for live edge media content item segments by parsing the URL of the read request and, for requests to read a media content item segment, comparing a requested media content item segment time with a world clock and information for the media content. The CDN stack computes each segment time considering the requested media content item segment identifier, segment duration, start segment number, and start segment arrival time. The CDN stack determines that the read request is for a live edge media content item segment, rather than for a DVR media content item segment, if the computed time difference is within a predefined range. At the time of a traffic surge, the live origin server can drop requests for DVR media content item segments, which have lower priority, and dedicate the live origin resources to satisfying, in order of priority, write requests, requests for manifest information specifying the segments and/or versions of media content items, and requests for media content item segments associated with the live edge.

At least one technical advantage of the disclosed techniques relative to the prior art is that the disclosed techniques can more effectively handle requests to a live origin server during traffic surges by separately handling read and write requests and by prioritizing more important requests over less important requests. In addition, the disclosed techniques read media content item segments from a cache of the live origin server, which can prevent a datastore of the live origin server from being overwhelmed during traffic surges which may negatively impact availability of the live origin service. Further, the disclosed techniques provide strong read-after-write consistency, allowing the live origin server to determine if a media content item segment has changed as the result of a write request, in which case the live origin can return the media content item segment from the datastore rather than from the cache. These technical advantages represent one or more technological improvements over prior art approaches.

System Overview

FIG. 1 illustrates a block diagram of a computer-based system 100 configured to implement one or more aspects of the various embodiments. As shown, system 100 includes, without limitation, a media connector 102, an encoder 104, a packager 106, a live origin server 140 connected to a datastore 108 and a cache 110, and one or more CDN servers 112(1)-(N) (referred to herein collectively as CDN servers 112 and individually as a CDN server 112) in communication with one or more user devices 114 via a network (not shown), such as the Internet.

Media connector 102 is a system component or interface that receives transmitted data from media sources (not shown) and live media feeds (not shown), terminates the transmission, and extracts video streams from the transmitted data. Media connector 102 can enable the exchange of various types of media, such as video and/or audio, by supporting different protocols and data formats. Media connector 102 can incorporate hardware and/or software to manage data translation, signal conversion, or protocol adaptation, ensuring appropriate routing of media content across diverse environments.

Encoder 104 is specialized software and/or hardware designed to convert digital content into a suitable format for storage, transmission, and/or display. Encoder 104 can process various types of content, such as audio and/or video, by applying compression algorithms and encoding schemes to transform raw data content into one or more optimized, standardized formats. Encoder 104 can support multiple encoding standards and codecs to accommodate different content types and delivery platforms. For example, encoder 104 can perform video transcoding and generate different audio/video bit rates and segment encoded video into small chunks for live distribution.

Packager 106 is a publishing server that can transform, manage, and distribute digital content across a network. Packager 106 can manage the workflow for content updates, ensuring that content is properly prepared and formatted for dissemination. Packager 106 can include any software for content management, authentication, and distribution automation. For example, packager 106 can take the encoded chunks from encoder 104 and perform digital rights management (DRM) encryption, then transmit the encrypted chunks to live origin server 140.

Live origin server 140 is a server that can be used to transmit media content items (e.g., video and/or audio) and related metadata to client applications (also referred to herein as "clients") that play back the media content items. In some embodiments, live origin server 140 receives packaged media content items for distribution from packager 106, and live origin server 140 is considered the source of truth for the media content items. Illustratively, live origin server 140 includes, without limitation, a live origin application 146. Live origin application 146 can be stored in a memory, and execute on one or more processors, of live origin server 150, as discussed in greater detail below in conjunction with FIG. 2.

Live origin application 146 can receive and process requests from packager 110 to write media content item data and/or associated manifest information (also referred to herein as "write requests") to storage, shown as datastore 108 and cache 110. A manifest includes metadata that indicates the segments and/or versions of a media content item. Live origin application 146 can also receive and process requests for media content item data and/or manifest information (also referred to herein as "read requests") from client applications running on user devices 114. In some embodiments, when datastore 108 utilization is considered high, live origin application 146 prioritizes processing of the write requests and certain read requests for manifest information and segments of media content items (also referred to herein as "media content item segments") associated with a live edge, as discussed in greater detail below. Live origin application 146 also implements a caching mechanism that stores media content item segments in a manner that decouples read and write requests. The caching mechanism can reduce the number of requests to retrieve data from datastore 108 and improve response times by retrieving media content item segments from cache 110 instead. Live origin application 146 can also ensure write/read consistency by providing the most updated media content item segments.

Datastore 108 provides non-volatile storage for applications and data in live origin server 140. For example, and without limitation, media content item segments, manifest information, and/or associated metadata can be stored in datastore 108. In some embodiments, datastore 108 can include one or more fixed or removable hard disk drives, flash memory devices, CD-ROMs (compact disc read-only-memories), DVD-ROMs (digital versatile disc-ROMs), Blurays, HD-DVDs (high definition DVDs), and/or other magnetic, optical, or solid state storage devices. In some embodiments, datastore 108 can be a network attached storage (NAS) and/or a storage area-network (SAN). Although shown as coupled to live origin server 140, in various embodiments, live origin server 140 can include datastore 108.

Cache 110 provides non-volatile and/or volatile storage for applications and data in live origin server 140. For example, and without limitation, media content item segments can be stored in cache 110. In some embodiments, cache 110 can include one or more random access memories (RAMs), fixed or removable hard disk drives, flash memory devices, CD-ROMs (compact disc read-only-memories), DVD-ROMs (digital versatile disc-ROMs), Blu-rays, HD- DVDs (high definition DVDs), and/or other magnetic, optical, or solid state storage devices. Datastore 108 can be a network attached storage (NAS) and/or a storage area-network (SAN). In some embodiments, cache 110 can be an ephemeral volatile (EV) cache that includes memory and one or more ephemeral disks. Although shown as coupled to live origin server 140, in various embodiments, live origin server 140 can include cache 110.

CDN servers 112 include one or more specialized computing devices designed to efficiently deliver media content, such as media content item segments, to client applications. CDN servers 112 can be geographically distributed to minimize the distance media content travels when being delivered to clients. CDN servers 112 can be positioned at the edge of a network, closer to clients. CDN servers 112 can also act as intermediaries between clients and live origin server 140 by requesting media content from live origin server 140 when such media content is not available in CDN servers 112 cache. In some embodiments, CDN servers 112 can distribute incoming traffic among multiple servers to optimize resource use, avoid overload, and increase performance.

User devices 114 are electronic devices that individuals utilize to interact with digital content or services over a network. User devices 114 can include, but are not limited to, personal computers, laptops, smartphones, tablets, smart TVs, gaming consoles, and/or wearable devices such as smartphones with an application to stream media content. Client applications (not shown) running on user devices 114 can connect to and communicate with CDN servers 112 or other network components to access, consume and manipulate content or engage in various digital activities, such as streaming media content. User devices 114 can include processors, memory, communication interfaces, and user interfaces.

System 100 is shown herein is for illustrative purposes only, and variations and modifications are possible without departing from the scope of the present disclosure. For example, the number and types of servers, and/or the number of user devices can be modified as desired. As specific examples, in some embodiments, multiple pipelines that include media connectors, encoders, and packagers can exist, and/or multiple live origin servers can be used. Further, the connection topology between the various units in FIG. 1 can be modified as desired. In some embodiments, any combination of the servers and/or user devices can be included in and/or replaced with any type of virtual computing system, distributed computing system, and/or cloud computing environment, such as a public, private, or a hybrid cloud system.

Figure 2:
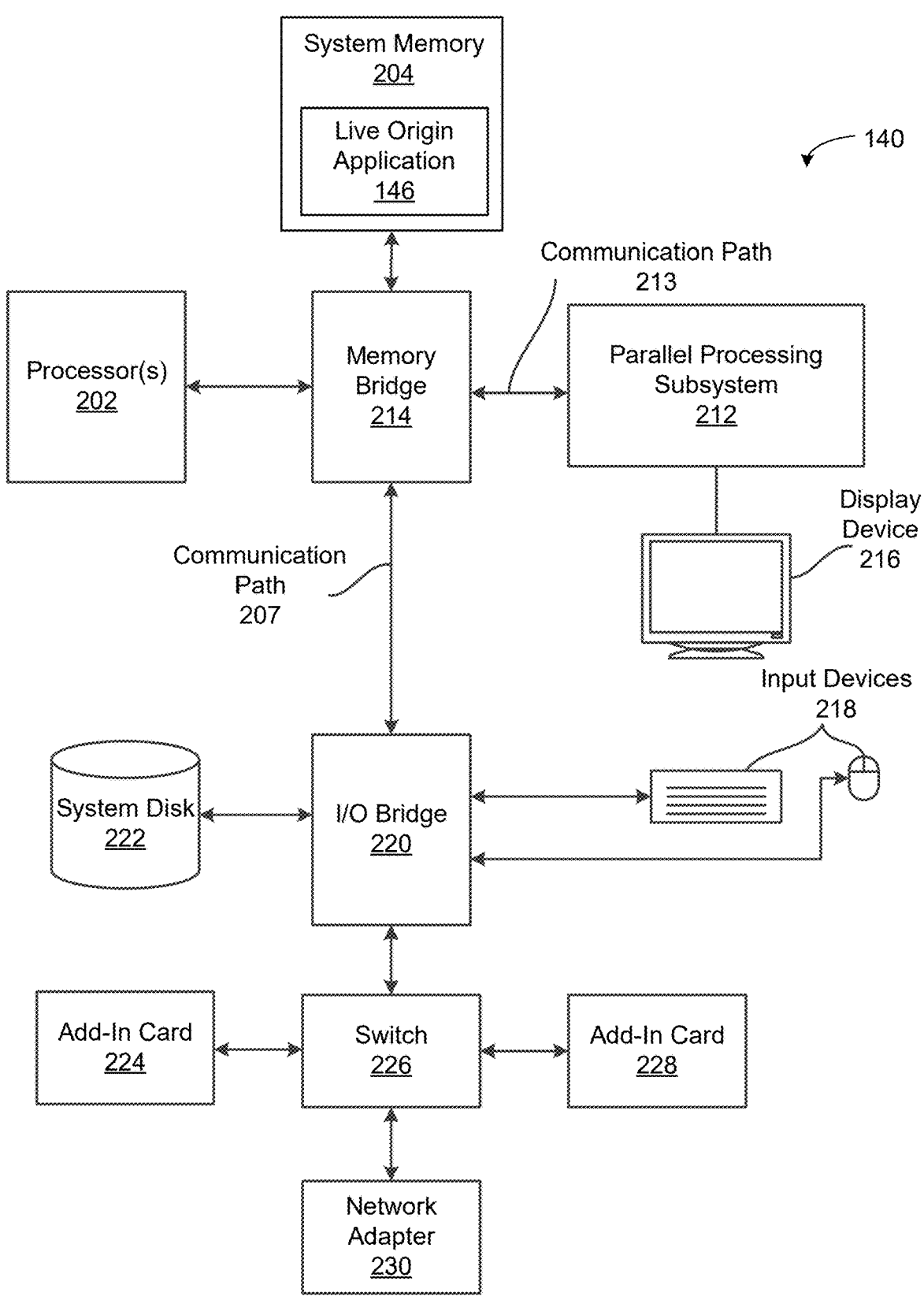
FIG. 2 is a more detailed illustration of the live origin server of FIG. 1, according to various embodiments.

FIG. 2 is a more detailed illustration of live origin server 140 of FIG. 1, according to the various embodiments. Live origin server 140 may be any type of computing device, including, without limitation, a server machine, a server platform, a desktop machine, a laptop machine, a hand-held/mobile device, a digital kiosk, an in-vehicle infotainment system, and/or a wearable device. In some embodiments, live origin server 140 is a server machine operating in a data center or a cloud computing environment that provides scalable computing resources as a service over a network.

As shown, the live origin server 140 includes, without limitation, processor(s) 202 and system memory(ies) 204 coupled to a parallel processing subsystem 212 via a memory bridge 214 and a communication path 213. Memory bridge 214 is further coupled to an I/O (input/output) bridge 220 via a communication path 207, and I/O bridge 220 is, in turn, coupled to a switch 226.

In various embodiments, I/O bridge 220 is configured to receive user input information from optional input devices 218, such as a keyboard, mouse, touch screen, sensor data analysis (e.g., evaluating gestures, speech, or other information about one or more uses in a field of view or sensory field of one or more sensors), and/or the like, and forward the input information to the processor(s) 202 for processing. In some embodiments, live origin server 140 may be a server machine in a cloud computing environment. In such embodiments, live origin server 140 may not include input devices 218, but may receive equivalent input information by receiving commands (e.g., responsive to one or more inputs from a remote computing device) in the form of messages transmitted over a network and received via the network adapter 230. In some embodiments, switch 226 is configured to provide connections between I/O bridge 220 and other components of live origin server 140, such as a network adapter 230 and various add-in cards 224 and 228.

In some embodiments, I/O bridge 220 is coupled to a system disk 222 that may be configured to store content and applications and data for use by processor(s) 202 and parallel processing subsystem 212. In one embodiment, system disk 222 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid state storage devices. In various embodiments, other components, such as universal serial bus or other port connections, compact disc drives, digital versatile disc drives, film recording devices, and the like, may be connected to I/O bridge 220 as well.

In various embodiments, memory bridge 214 may be a Northbridge chip, and I/O bridge 220 may be a Southbridge chip. In addition, communication paths 207 and 213, as well as other communication paths within live origin server 140, may be implemented using any technically suitable protocols, including, without limitation, AGP (Accelerated Graphics Port), HyperTransport, or any other bus or point-to-point communication protocol known in the art.

In some embodiments, parallel processing subsystem 212 comprises a graphics subsystem that delivers pixels to an optional display device 216 that may be any conventional cathode ray tube, liquid crystal display, light-emitting diode display, and/or the like. In such embodiments, the parallel processing subsystem 212 may incorporate circuitry optimized for graphics and video processing, including, for example, video output circuitry. Such circuitry may be incorporated across one or more parallel processing units (PPUs), also referred to herein as parallel processors, included within the parallel processing subsystem 212.

In some embodiments, the parallel processing subsystem 212 incorporates circuitry optimized (e.g., that undergoes optimization) for general purpose and/or compute processing. Again, such circuitry may be incorporated across one or more PPUs included within parallel processing subsystem 212 that are configured to perform such general purpose and/or compute operations. In yet other embodiments, the one or more PPUs included within parallel processing subsystem 212 may be configured to perform graphics processing, general purpose processing, and/or compute processing operations. Memory 204 includes at least one device driver configured to manage the processing operations of the one or more PPUs within parallel processing subsystem 212. Illustratively, memory 204 includes, without limitation, live origin application 146.

In various embodiments, parallel processing subsystem 212 may be integrated with one or more of the other elements of FIG. 2 to form a single system. For example, parallel processing subsystem 212 may be integrated with processor 202 and other connection circuitry on a single chip to form a system on a chip (SoC).

In some embodiments, communication path 213 is a PCI Express link, in which dedicated lanes are allocated to each PPU. Other communication paths may also be used. The PPU advantageously implements a highly parallel processing architecture, and the PPU may be provided with any amount of local parallel processing memory (PP memory).

It will be appreciated that the system shown herein is illustrative and that variations and modifications are possible. The connection topology, including the number and arrangement of bridges, the number of CPUs 202, and the number of parallel processing subsystems 212, may be modified as desired. For example, in some embodiments, system memory 204 could be connected to the processor(s) 202 directly rather than through memory bridge 214, and other devices may communicate with system memory 204 via memory bridge 214 and processor 202. In other embodiments, parallel processing subsystem 212 may be connected to I/O bridge 220 or directly to processor 202, rather than to memory bridge 214. In still other embodiments, I/O bridge 220 and memory bridge 214 may be integrated into a single chip instead of existing as one or more discrete devices. In certain embodiments, one or more components shown in FIG. 2 may not be present. For example, switch 226 could be eliminated, and network adapter 230 and add-in cards 224, 228 would connect directly to I/O bridge 220. Lastly, in certain embodiments, one or more components shown in FIG. 2 may be implemented as virtualized resources in a virtual computing environment, such as a cloud computing environment. In particular, the parallel processing subsystem 212 may be implemented as a virtualized parallel processing subsystem in at least one embodiment. For example, the parallel processing subsystem 212 may be implemented as a virtual graphics processing unit(s) (vGPU(s)) that renders graphics on a virtual machine(s) (VM(s)) executing on a server machine(s) whose GPU(s) and other physical resources are shared across one or more VMs.

Traffic Surge Protection of Live Origin Server

Figure 3:
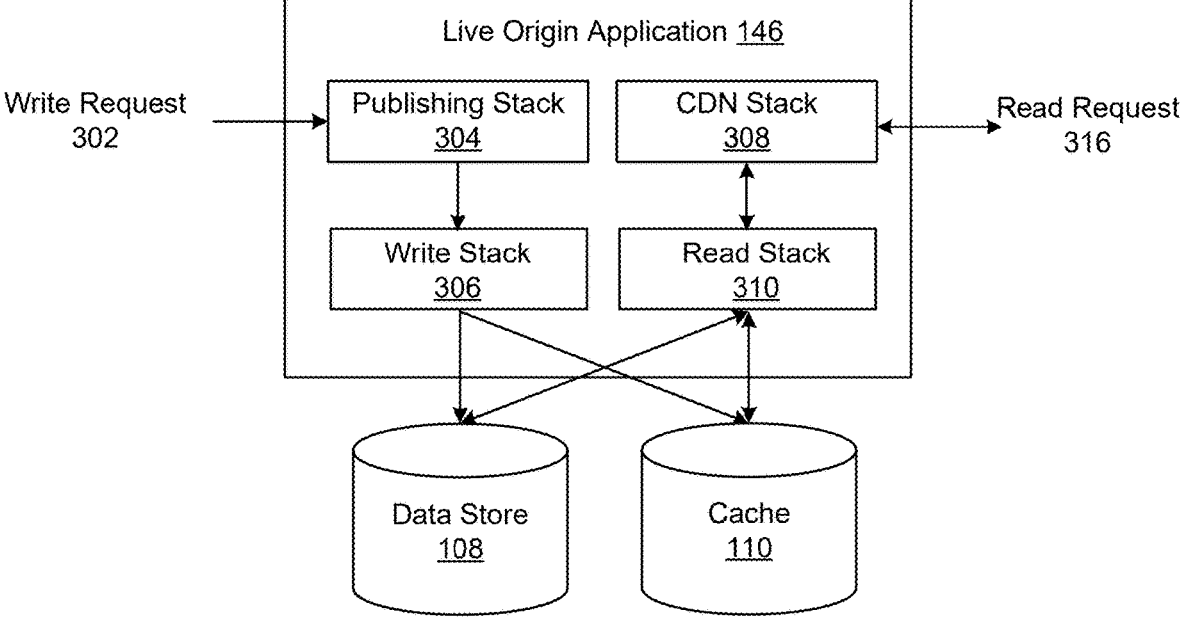
FIG. 3 is a more detailed illustration of live origin application of FIG. 1, according to various embodiments.

FIG. 3 is a more detailed illustration of live origin application 146 of FIG. 1, according to various embodiments. As shown, live origin application 146 includes a publishing stack 304, a write stack 306, a CDN stack 308, and a read stack 310. In operation, live origin application 146 can receive write requests, shown as a write request 302, and read requests, shown as a read request 316. In response to receiving a write request to write media content data, live origin application 146 writes media content data included in write request to datastore 108 and cache 110. In response to receiving a write request to write manifest information, live origin application 146 writes manifest information included in the write request to datastore 108. In response to a read request for media content data, live origin application 146 returns a media content item or portion thereof, such as a media content item segment, that is being requested to a client application that made the request. In response to a read request for manifest information, live origin application 146 returns the manifest information that is being requested to a client application that made the request. As described, live origin application 146 may receive read requests when CDN servers 112 are down or when CDN servers 112 have not cached requested media content items or manifest information and, as a result, forward the read requests to live origin application 146.

Write request 302 can be a request from packager 106 to write a segment of a media content item and corresponding metadata, and/or manifest information, to live origin application 146. For example, write request 302 can request to write a media content item segment related to a live stream. Read request 316 is a request for a segment of a media content item or manifest information from live origin application 146. For example, read request 316 can request, from live origin application 146, a segment of a live streaming media content item or a DVR media content item. As discussed in greater detail below, read and write paths in live origin application 146 are separated for performance and security reasons, and requests are prioritized during traffic surges so that less important requests are dropped before more important requests.

Publishing stack 304 receives write request 302 from packager 106 and sends a request to write stack 306 to process write request 302. Upon receiving a write request to write a media content item segment, publishing stack 304 assigns a unique segment ID, segment arrival time, and segment duration to the media content item segment of the write request. Publishing stack 304 requests that write stack 306 write the media content item segment and corresponding metadata, including the segment ID, segment arrival time, and segment duration, to datastore 108. Write stack 306 writes the media content item segment and corresponding metadata specifying to the media content item segment to datastore 108.

In some embodiments, publishing stack 304 asynchronously requests that write stack 306 write the same media content item segment to cache 110. As described, in some embodiments, cache 110 can be an ephemeral volatile (EV) cache that uses memory and one or more ephemeral disks to store data, such as the media content item segment. In such cases, cache 110 can handle multiple orders of magnitude more requests than datastore 108 (i.e., cache 110 has a higher throughput than datastore 108), and requests for media content segments can, if possible, be satisfied using cache 110 to protect datastore 108 from traffic surges. In some embodiments, each media content item segment written to cache 110 is addressable using corresponding metadata written to datastore 108. In some other embodiments, publishing stack 304 requests that write stack 308 write media content item segments in sequence (referred to herein as a synchronous pipeline). For example, in a synchronous pipeline, publishing stack 304 will not request write stack 306 to write content media segment N+1 before content media segment N is successfully written in datastore 108. In some embodiments, publishing stack 304 updates the metadata corresponding to a media content item segment in datastore 108 if the media content item segment is updated in datastore 108.

CDN stack 308 receives read request 316 for a media content item segment. CDN stack 308 stores information associated with the media content item that indicates the arrival time of a first segment of the media content item, a segment number of a first content item segment, and a frequency of content media segments. CDN stack 308 retrieves metadata related to the requested media content item segment from datastore 108 using read stack 310, and the CDN stack 308 requests, via the read stack 310, the media content item segment from cache 110 using the metadata. Each requested media content item segment has a specific ID that is addressable in cache 110 using the metadata retrieved from datastore 108. If the request is for a media content item segment associated with a specific ID and read stack 310 can find the ID in cache 110, CDN stack 308 determines that the media content item segment is in cache 110. On the other hand, if read stack 310 cannot find the ID in cache 110, CDN stack 308 determines that the media content item segment is not stored in cache 110. If the media content item segment is not stored in cache 110, then read stack 310 will read the media content item segment from the datastore 108 instead. Accordingly, CDN stack 308 ensures write/read consistency by providing the most updated media content. In addition, reading metadata, which is small in size and can be frequently updated, from datastore 108 is computationally inexpensive relative to retrieving media content item segments.

In some embodiments, read stack 310 detects traffic surges by tracking datastore 108 utilization, such as by computing a percentage of datastore 108 responses that are slower than a predefined threshold that indicates high datastore 108 utilization, i.e., a traffic surge or pending traffic surge. In some embodiments, read stack 310 can receive notifications of high utilization from datastore 108, indicating a traffic surge or pending traffic surge. Read stack 310 notifies CDN stack 308 of detected traffic surges. During high datastore 108 utilization, CDN stack 308 drops DVR read requests 316, in which DVR media content item segments are being read by CDN stack 308 from cache 110 or datastore 108, to prioritize write request 302, in which new media content item segments are being written by packager 106 to datastore 108.

For read request 316, CDN stack 308 prioritizes requests for manifests and for media content item segments associated with a live edge over requests for DVR media content item segments. As described, a manifest includes metadata that indicates the segments and/or versions of a media content item. In some embodiments, manifests can be generated by encoder 104 and used to provide read-after-write consistency. CDN stack 308 determines the type of a read request (i.e., whether the read request is for a manifest, a live edge media content item segment, or a DVR media content item segment) by parsing the uniform resource locator (URL) of read request 316. The URL can include a code that specifies a manifest, or the URL can include a code that specifies a particular media content item segment. If the URL specifies a particular media content item segment, CDN stack 308 compares a time associated with the particular media content item segment with a world clock and information for the media content item to determine whether read request 316 is for a live edge media content item segment that is within a threshold of the world clock time. CDN stack 308 computes the time associated with the requested media content item segment based on the requested media content item segment ID, a segment duration, and a starting segment number of the media content item captured when a first segment is processed, and a starting segment arrival time captured dynamically as state information in CDN stack 308. In some embodiments, the starting segment number can be in the URL of the segment, or can be embedded in the segment media itself. CDN stack 308 determines that read request 316 is for a live edge media content item segment if a time associated with the requested segment is within a predefined threshold, such as a certain number of minutes (e.g., 5 minutes) of the world clock time. CDN stack 308 determines that read request 316 is for a DVR media content item segment if the time associated with the requested segment is not within the predefined threshold of the world clock time. During a traffic surge, CDN stack 308 can drop requests for DVR media content item segments, which have lower priority, and dedicate the live origin server 140 resources to satisfying, in order of priority, write requests, read requests for manifest information, and requests for media content item segments associated with the live edge.

Figure 4:
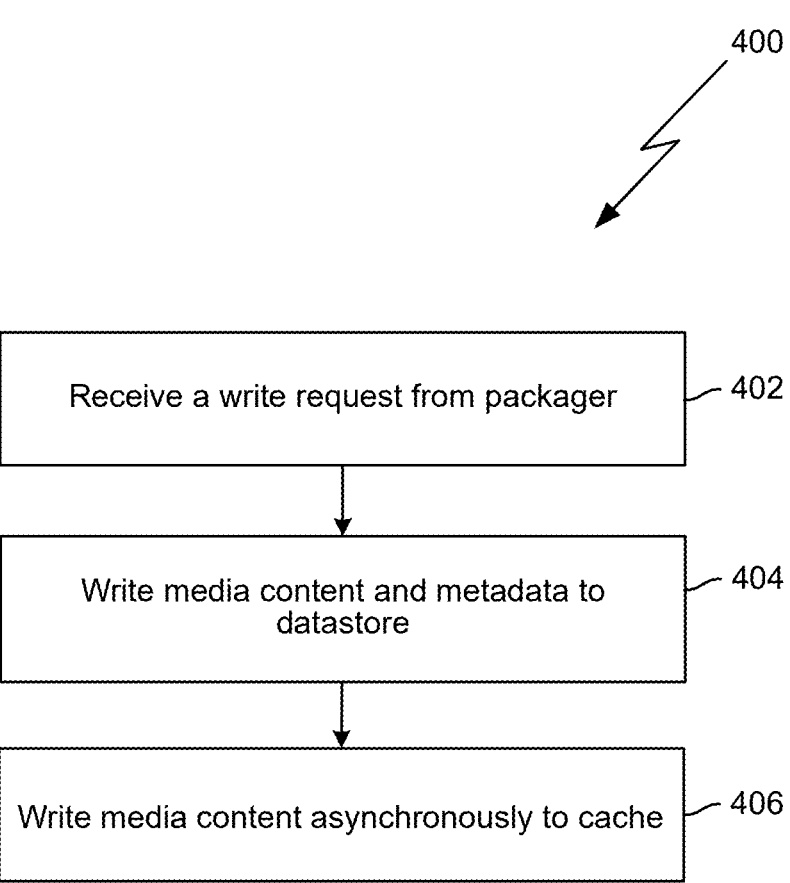
FIG. 4 is a flow diagram of method steps for writing media content and associated metadata, according to various embodiments.

FIG. 4 is a flow diagram of method steps for writing media content and associated metadata, according to various embodiments. Although the method steps are described in conjunction with the systems of FIGS. 1-3, persons skilled in the art will understand that any system configured to perform the method steps in any order falls within the scope of the various embodiments.

As shown, a method 400 begins at step 402, where publishing stack 304 receives a write request 302 from packager 106. Write request 302 is a request from packager 106 to write a segment of a media content item and corresponding metadata, and/or manifest information, to live origin application 146. For example, write request 302 can request to write a media content item segment related to a live stream-media content item. In some embodiments, configuration information can also be used to configure CDN stack 308 with an event ID for a media content item and frequency of media content item segments.

At step 404, assuming that write request 302 is a request to write a media content segment and corresponding metadata, publishing stack 304 sends a request to write stack 306 to write the media content item segment from write request 302 and corresponding metadata to datastore 108. In some embodiments publishing stack 304 assigns a unique segment ID, segment arrival time, and segment duration to the media content item segment of write request 302. Publishing stack 304 requests that write stack 306 write the media content item segment and corresponding metadata, including the segment ID, segment arrival time, and segment duration, to datastore 108. In response to the request, write stack 306 writes the media content item segment and corresponding metadata to datastore 108. In some other embodiments, publishing stack 304 requests that write stack 306 write media content item segments in sequence (referred to herein as a synchronous pipeline). In some embodiments, publishing stack 304 updates the metadata corresponding to a media content item segment in datastore 108 if the media content item segment is updated in datastore 108. In some embodiments in which a write request is received to write manifest information, publishing stack 304 can request that write stack 306 write the manifest information to datastore 108.

At step 406, publishing stack 304 asynchronously requests that write stack 306 write the same media content item segment that has been written to datastore 108 to cache 110. In some embodiments, cache 110 can be an EV cache that uses memory and one or more ephemeral disks to store data, including the media content item segment. In some embodiments, each media content item segment written to cache 110 is addressable using corresponding metadata written to datastore 108.

Figure 5:
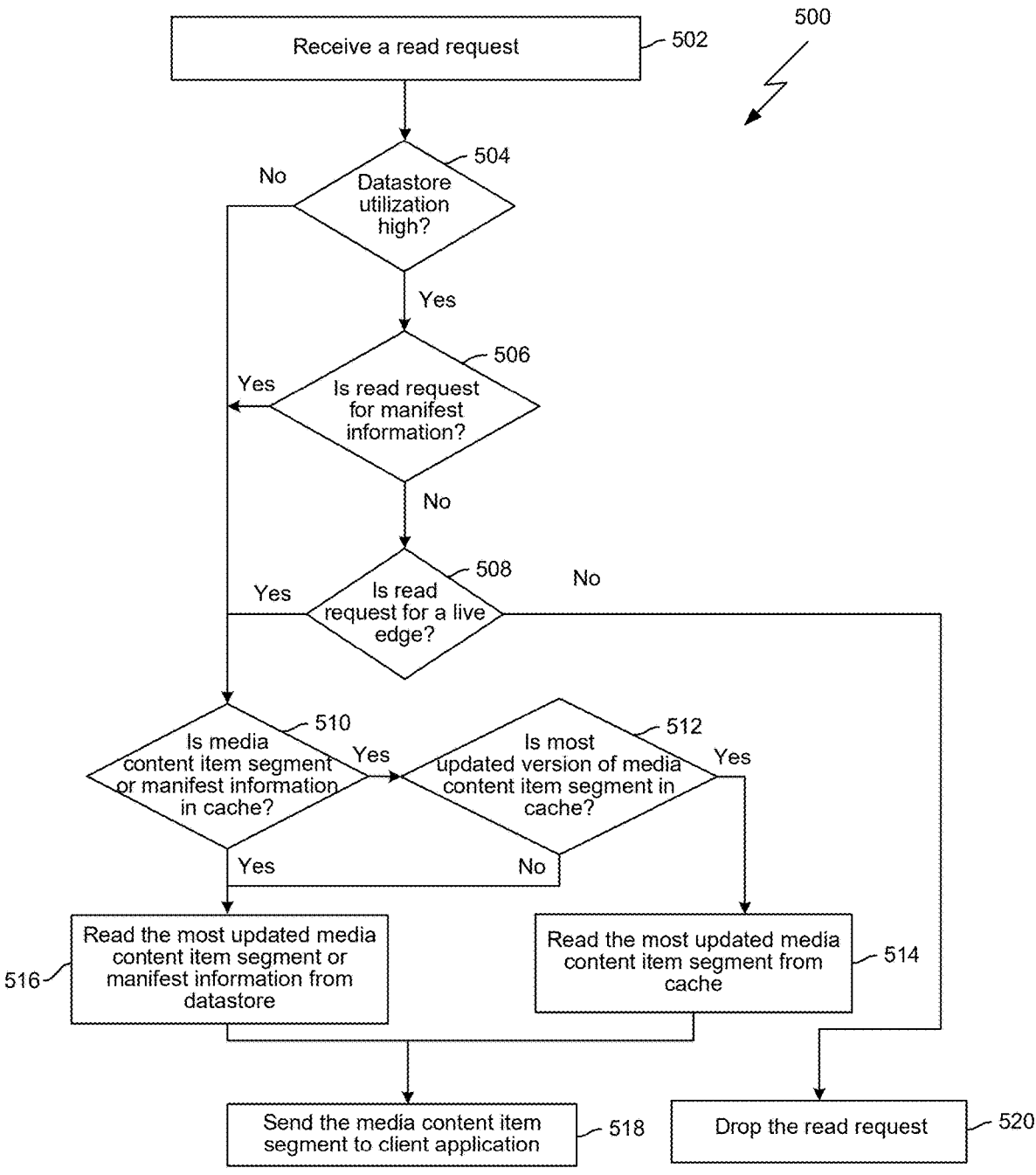
FIG. 5 is a flow diagram of method steps for processing a read request, according to various embodiments.

FIG. 5 is a flow diagram of method steps for processing a read request, according to various embodiments. Although the method steps are described in conjunction with the systems of FIGS. 1-3, persons skilled in the art will understand that any system configured to perform the method steps in any order falls within the scope of the various embodiments.

As shown, a method 500 begins at step 502, where CDN stack 308 receives read request 316. Read request 316 can be a request for a segment of a media content item or a request for manifest information indicating the segments and/or versions of a media content item. For example, read request 316 could request a segment of a live streaming media content item or a DVR media content item. As described, live origin application 146 may receive read requests when CDN servers 112 are down or when CDN servers 112 have not cached requested media content items or manifest information and, as a result, forward the read requests to live origin application 146.

At step 504, if read stack 310 determines that datastore 108 utilization is high, method 500 continues to step 506. On the other hand, if read stack 310 determines that datastore 108 utilization is not high, method 500 continues to step 510. In some embodiments, read stack 310 determines whether datastore 108 utilization is high by tracking a percentage of datastore 108 responses that are slower than a predefined threshold that indicates high datastore 108 utilization, i.e., a traffic surge or pending traffic surge. In some embodiments, read stack 310 can receive notifications of high utilization from datastore 108, indicating a traffic surge or pending traffic surge. During high datastore 108 utilization, CDN stack 308 drops DVR read requests 316, in which DVR media content item segments are being read by CDN stack 308 from cache 110 or datastore 108, to prioritize write request 302 (e.g., write request 302), in which new media content item segments are being written by packager 106 to datastore 108. For example, in some embodiments, write requests can be processed according to method 400, described above in conjunction with FIG. 4, while read requests may be dropped during high datastore 108 utilization according to method 500. In addition, CDN stack 308 can prioritize certain requests, such as read requests for manifest information and media content item segments associated with a live edge over other read requests, such as read requests for media content segments that are not associated with the live edge.

At step 506, CDN stack 308 determines whether read request 316 is for manifest information. As described, manifest information can indicate which media content item segments and/or versions are available in live origin application 146. If a client application does not have such manifest information, the client application may not be able to make the necessary requests for media content item segments. In some embodiments, CDN stack 308 determines the type of a read request (i.e., whether the read request is for a manifest, a live edge media content item segment, or a DVR media content item segment) by parsing a URL of read request 316. In such cases, the URL can specify a manifest, or the URL can specify a particular media content item segment. If the URL specifies a manifest, method 500 continues to step 510. Alternatively, if the URL specifies a read request other than a manifest, then method 500 continues to step 508.

At step 508, CDN stack 308 determines whether read request 316 is for a live edge media content item segment. In some embodiments, CDN stack 308 determines the type of a read request (i.e., whether the read request is for a manifest, a live edge media content item segment, or a DVR media content item segment) by parsing a URL of read request 316. In such cases, the URL can specify a manifest, or the URL can specify a particular media content item segment. If the URL specifies a particular media content item segment, CDN stack 308 compares a time associated with the particular media content item segment with a world clock to determine whether read request 316 is for a live edge media content item segment that is within a threshold of the world clock time.

In some embodiments, CDN stack 308 computes the time associated with the requested media content item segment based on the requested media content item segment ID, a segment duration, and a starting segment number of the media content item captured when a first segment is processed, and a starting segment arrival time captured dynamically as state information in CDN stack 308, described above. CDN stack 308 determines that read request 316 is for a live edge media content item segment if the time associated with a requested media content item segment is within a predefined threshold, such as a certain number of minutes (e.g., 5 minutes) of the world clock time. CDN stack 308 determines that read request 316 is for a DVR media content item segment if the time associated with the request is not within the predefined threshold of the world clock time.

During high datastore 108 utilization, CDN stack 308 prioritizes requests for manifest information and for media content item segments associated with a live edge over requests for DVR media content item segments. If CDN stack 308 determines that read request 316 is for a live edge media content item segment, method 500 continues to step 510. On the other hand, if CDN stack 308 determines that read request 316 is not for a live edge media content item segment, method 500 continues to step 520, where CDN stack 308 drops the read request 316 with lower priority. As described in conjunction with step 506, during a traffic surge, CDN stack 308 can drop requests for DVR media content item segments, which have lower priority, and dedicate the live origin resources to satisfying, in order of priority, write requests, read requests for manifest information, and requests for media content item segments associated with the live edge. Although described with respect to dropping read request 316 for simplicity, in some embodiments, not all read requests for DVR media content item segments may be dropped. For example, in some embodiments, live origin application 146 can implement different behaviors depending on the datastore 108 and/or cache 110 utilization, such as dropping all requests for DVR media content item segments if a threshold datastore 108 utilization is exceeded.

At step 510, CDN stack 308 determines whether the requested media content item segment or manifest information is in cache 110. In some embodiments, CDN stack 308 uses read stack 310 to retrieve, from datastore 108, the manifest information or metadata related to a requested media content item segment. Each requested media content item segment has a specific ID that is addressable in cache 110. If the request is for a media content item segment associated with a specific ID and read stack 310 can find the ID in cache 110, CDN stack 308 determines that the media content item segment is in cache 110, and method 500 continues to step 514. On the other hand, if read stack 310 cannot find the ID in cache 110, CDN stack 308 determines that the media content item segment is not stored in cache 110, and method 500 continues to step 516.

At step 512, CDN stack 308 determines whether a most updated version of content media item segment is in cache 110. As described in conjunction with step 510, CDN stack 308 retrieves metadata related to the requested media content item segment using read stack 310. If the metadata indicates that the media content item segment has been updated in datastore 108, then CDN stack 308 determines that the most updated version of content media item segment is in cache 110, and method 500 continues to step 514.

At step 514, CDN stack 308 reads the most updated media content item segment from cache 110. In some embodiments, CDN stack 308 retrieves, via read stack 310, the most updated media content item segment from cache 110.

On the other hand, if CDN stack 308 determines at step 510 that the most updated version of content media item segment or manifest information is not in cache 110, then method 500 continues to step 516, where CDN stack 308 reads the most updated media content item segment or manifest information from datastore 108. CDN stack 308 retrieves the most updated media content item segment or manifest information via read stack 310 from datastore 108. CDN stack 308 ensures write/read consistency by providing the most updated media content item segment.

At step 518, CDN stack 308 sends the retrieved data to a client application that made the request received at step 502. The retrieved data can include manifest information or media content item segments associated with a live edge or DVR media content item segments.

In sum, techniques are disclosed for protecting a live origin server from traffic surges. In some embodiments, read and write paths in the live origin server are separated, and requests are prioritized during traffic surges so that less important requests are dropped before more important requests. When a publishing stack of the live origin server receives a request from the source of a media content item to write a segment of the media content item, the publishing stack assigns a unique segment identifier (ID), segment arrival time, and segment duration to the media content item segment. Then, the publishing stack requests a write stack of the live origin server to write the media content item segment to a datastore. The write stack writes the media content item segment and metadata specifying the ID and the timestamp to the datastore. Asynchronously, the publishing stack writes the media content item segment to a cache of the live origin server. The media content item segment written to the cache is addressable using the metadata written to the datastore. When a read request for a media content item segment is received by the live origin server, a CDN stack of the live origin server retrieves metadata related to the media content item segment using a read stack of the live origin server, and the CDN stack requests, via the read stack and using the metadata, the media content item segment from the cache. The cache can return the media content item segment to the read stack if the media content item segment is stored in the cache. If the media content item segment is not stored in the cache, or if the metadata indicates that the media content item segment has been updated in the datastore, then the read stack will read the media content item segment from the datastore instead. The live origin server also detects traffic surges by tracking datastore utilization, such as by computing a percentage of datastore responses that are slower than a predefined threshold that indicates high datastore utilization, i.e., a traffic surge or pending traffic surge. During high datastore utilization, the live origin server prioritizes write requests, in which new media content item segments are being written to the live origin server, over read requests, in which media content item segments are being read by client applications from the live origin server. For the read requests, the CDN stack prioritizes requests for media content item segments associated with a live edge over requests for DVR media content item segments. The CDN stack detects a read request for live edge media content item segments by parsing the URL of the read request and, for requests to read a media content item segment, comparing a requested media content item segment time with a world clock. The CDN stack computes each segment time considering the requested media content item segment identifier, segment duration, start segment number, and start segment arrival time. The CDN stack determines that the read request is for a live edge media content item segment, rather than for a DVR media content item segment, if the computed time difference is within a predefined range. At the time of a traffic surge, the live origin server can drop requests for DVR media content item segments, which have lower priority, and dedicate the live origin resources to satisfying, in order of priority, write requests, requests for manifest information specifying the segments and/or versions of media content items, and requests for media content item segments associated with the live edge.

At least one technical advantage of the disclosed techniques relative to the prior art is that the disclosed techniques can more effectively handle requests to a live origin server during traffic surges by separately handling read and write requests and by prioritizing more important requests over less important requests. In addition, the disclosed techniques read media content item segments from a cache of the live origin server, which can prevent a datastore of the live origin server from being overwhelmed during traffic surges. Further, the disclosed techniques provide strong read-after-write consistency, allowing the live origin server to determine if a media content item segment has changed as the result of a write request, in which case the live origin can return the media content item segment from the datastore rather than from the cache. These technical advantages represent one or more technological improvements over prior art approaches.

1. A computer-implemented method for responding to requests for media content, the method comprising receiving a first request from a first client for at least one segment of a media content item, retrieving, from a datastore, a reference to each segment included in the at least one segment, retrieving, from a cache, the at least one segment of the media content item based on the reference to each segment included in the at least one segment, and transmitting the at least one segment of the media content item to the first client.

2. The computer-implemented method of claim 1, wherein the first request is associated with a first priority, and the method further comprises receiving a second request from a second client, wherein the second request is associated with a second priority that is lower than the first priority, and in response to determining that a load on the datastore is greater than a threshold, dropping the second request based on the second priority.

3. The computer-implemented method of claim 2, wherein the threshold is based on a predefined percentage of requests being processed by the datastore at a reduced speed.

4. The computer-implemented method of claim 2, further comprising determining that the load on the datastore is greater than the threshold based on a signal from the datastore.

5. The computer-implemented method of claim 1, further comprising determining the first request is associated with a first priority based on the at least one segment being within a predefined window of time from a live stream of the media content item.

6. The computer-implemented method of claim 1, further comprising receiving one or more segments of the media content item, generating metadata indicating one or more versions of the one or more segments, storing the metadata in the datastore, and storing the one or more segments of the media content item in the cache and in the datastore.

7. The computer-implemented method of claim 1, wherein the first request is associated with a first priority, and the first priority is lower than a second priority associated with requests to write data to the datastore.

8. The computer-implemented method of claim 1, wherein the first request is associated with a first priority, and the first priority is lower than a second priority associated with requests for manifest information indicating at least one of one or more versions or one or more segments of one or more media content items.

9. The computer-implemented method of claim 1, wherein the request is forwarded by a server device of a content distribution network (CDN) that does not store the at least one segment of the media content item.

10. The computer-implemented method of claim 1, wherein the cache comprises at least one of one or more memories or one or more ephemeral disks.

11. One or more non-transitory computer-readable media storing instructions that, when executed by at least one processor, cause the at least one processor to perform steps comprising receiving a first request from a first client for at least one segment of a media content item, retrieving, from a datastore, a reference to each segment included in the at least one segment, retrieving, from a cache, the at least one segment of the media content item based on the reference to each segment included in the at least one segment, and transmitting the at least one segment of the media content item to the first client.

12. The one or more non-transitory computer-readable media of claim 11, wherein the first request is associated with a first priority, and the method further comprises receiving a second request from a second client, wherein the second request is associated with a second priority that is lower than the first priority, and in response to determining that a load on the datastore is greater than a threshold, dropping the second request based on the second priority.

13. The one or more non-transitory computer-readable media of claim 12, wherein the threshold is based on a predefined percentage of requests being processed by the datastore at a reduced speed.

14. The one or more non-transitory computer-readable media of claim 12, wherein the instructions, when executed by the at least one processor, further cause the at least one processor to perform the step of determining that the load on the datastore is greater than the threshold based on a signal from the datastore.

15. The one or more non-transitory computer-readable media of claim 11, wherein the instructions, when executed by the at least one processor, further cause the at least one processor to perform the step of determining the second request is associated with a second priority based on the at least one other segment of the media content item that is specified in the second request not being within a predefined window of time from a live stream of the media content item.

16. The one or more non-transitory computer-readable media of claim 11, wherein the instructions, when executed by the at least one processor, further cause the at least one processor to perform the steps of receiving one or more segments of the media content item, generating metadata indicating one or more versions of the one or more segments, storing the metadata in the datastore, and storing the one or more segments of the media content item in the cache and in the datastore.

17. The one or more non-transitory computer-readable media of claim 11, wherein the first request is associated with a first priority, and the first priority is lower than a second priority associated with requests to write at least one of media content item segments or manifest information to the datastore.

18. The one or more non-transitory computer-readable media of claim 11, wherein the first request is associated with a first priority, and the first priority is lower than a second priority associated with requests for manifest information indicating at least one of one or more versions or one or more segments of one or more media content items.

19. The one or more non-transitory computer-readable media of claim 11, wherein the cache is associated with a higher throughput than the datastore.

20. A system, comprising a memory storing instructions, and a processor that is coupled to the memory and, when executing the instructions, is configured to perform the steps of receiving a first request from a first client for at least one segment of a media content item, retrieving, from a datastore, a reference to each segment included in the at least one segment, retrieving, from a cache, the at least one segment of the media content item based on the reference to each segment included in the at least one segment, and transmitting the at least one segment of the media content item to the first client.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for responding to requests for media content, the method comprising:
    receiving a first request from a first client for at least one segment of a media content item; and
    in response to the first request:
        retrieving, from a datastore, a reference to each segment included in the at least one segment;
        retrieving, from a cache, the at least one segment of the media content item based on the reference to each segment included in the at least one segment; and
        transmitting the at least one segment of the media content item to the first client.

2. The computer-implemented method of claim 1, wherein the first request is associated with a first priority, and the method further comprises:
    receiving a second request from a second client, wherein the second request is associated with a second priority that is lower than the first priority; and
    in response to determining that a load on the datastore is greater than a threshold, dropping the second request based on the second priority.

3. The computer-implemented method of claim 2, wherein the threshold is based on a predefined percentage of requests being processed by the datastore at a reduced speed.

4. The computer-implemented method of claim 2, further comprising determining that the load on the datastore is greater than the threshold based on a signal from the datastore.

5. The computer-implemented method of claim 1, further comprising determining the first request is associated with a first priority based on the at least one segment being within a predefined window of time from a live stream of the media content item.

6. The computer-implemented method of claim 1, further comprising:
　receiving one or more segments of the media content item;
　generating metadata indicating one or more versions of the one or more segments;
　storing the metadata in the datastore; and
　storing the one or more segments of the media content item in the cache and in the datastore.

7. The computer-implemented method of claim 1, wherein the first request is associated with a first priority, and the first priority is lower than a second priority associated with requests to write data to the datastore.

8. The computer-implemented method of claim 1, wherein the first request is associated with a first priority, and the first priority is lower than a second priority associated with requests for manifest information indicating at least one of one or more versions or one or more segments of one or more media content items.

9. The computer-implemented method of claim 1, wherein the first request is forwarded by a server device of a content distribution network (CDN) that does not store the at least one segment of the media content item.

10. The computer-implemented method of claim 1, wherein the cache comprises at least one of one or more memories or one or more ephemeral disks.

11. One or more non-transitory computer-readable media storing instructions that, when executed by at least one processor, cause the at least one processor to perform steps comprising:
　receiving a first request from a first client for at least one segment of a media content item; and
　in response to the first request:
　　retrieving, from a datastore, a reference to each segment included in the at least one segment;
　　retrieving, from a cache, the at least one segment of the media content item based on the reference to each segment included in the at least one segment; and
　　transmitting the at least one segment of the media content item to the first client.

12. The one or more non-transitory computer-readable media of claim 11, wherein the first request is associated with a first priority, and the steps further comprise:
　receiving a second request from a second client, wherein the second request is associated with a second priority that is lower than the first priority; and
　in response to determining that a load on the datastore is greater than a threshold, dropping the second request based on the second priority.

13. The one or more non-transitory computer-readable media of claim 12, wherein the threshold is based on a predefined percentage of requests being processed by the datastore at a reduced speed.

14. The one or more non-transitory computer-readable media of claim 12, wherein the instructions, when executed by the at least one processor, further cause the at least one processor to perform the step of determining that the load on the datastore is greater than the threshold based on a signal from the datastore.

15. The one or more non-transitory computer-readable media of claim 12, wherein the instructions, when executed by the at least one processor, further cause the at least one processor to perform the step of determining the second request is associated with the second priority based on the at least one segment of the media content item that is specified in the second request not being within a predefined window of time from a live stream of the media content item.

16. The one or more non-transitory computer-readable media of claim 11, wherein the instructions, when executed by the at least one processor, further cause the at least one processor to perform the steps of:
　receiving one or more segments of the media content item;
　generating metadata indicating one or more versions of the one or more segments;
　storing the metadata in the datastore; and
　storing the one or more segments of the media content item in the cache and in the datastore.

17. The one or more non-transitory computer-readable media of claim 11, wherein the first request is associated with a first priority, and the first priority is lower than a second priority associated with requests to write at least one of media content item segments or manifest information to the datastore.

18. The one or more non-transitory computer-readable media of claim 11, wherein the first request is associated with a first priority, and the first priority is lower than a second priority associated with requests for manifest information indicating at least one of one or more versions or one or more segments of one or more media content items.

19. The one or more non-transitory computer-readable media of claim 11, wherein the cache is associated with a higher throughput than the datastore.

20. A system, comprising:
　a memory storing instructions; and
　a processor that is coupled to the memory and, when executing the instructions, is configured to perform the steps of:
　　receiving a first request from a first client for at least one segment of a media content item, and
　　in response to the first request:
　　　retrieving, from a datastore, a reference to each segment included in the at least one segment,
　　　retrieving, from a cache, the at least one segment of the media content item based on the reference to each segment included in the at least one segment, and
　　　transmitting the at least one segment of the media content item to the first client.

\*　\*　\*　\*　\*